Nov. 21, 1961    J. T. MILLER    3,009,548
EXTRUDED STRUCTURAL MEMBER
Filed July 21, 1958
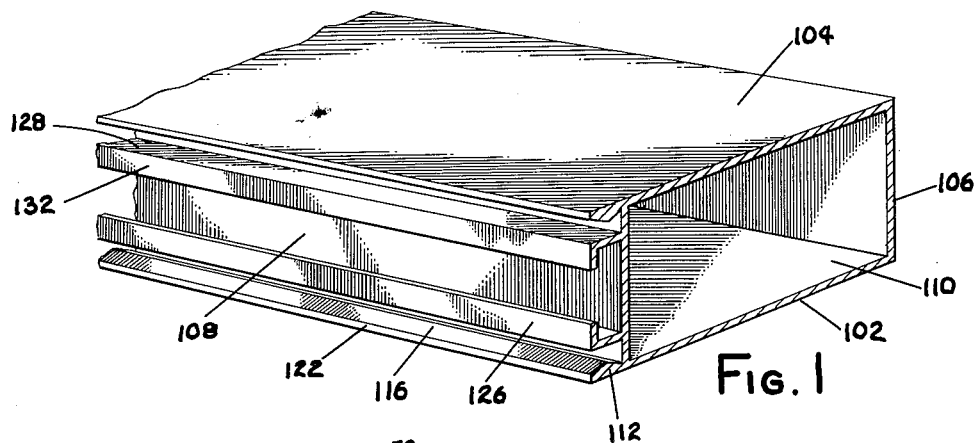
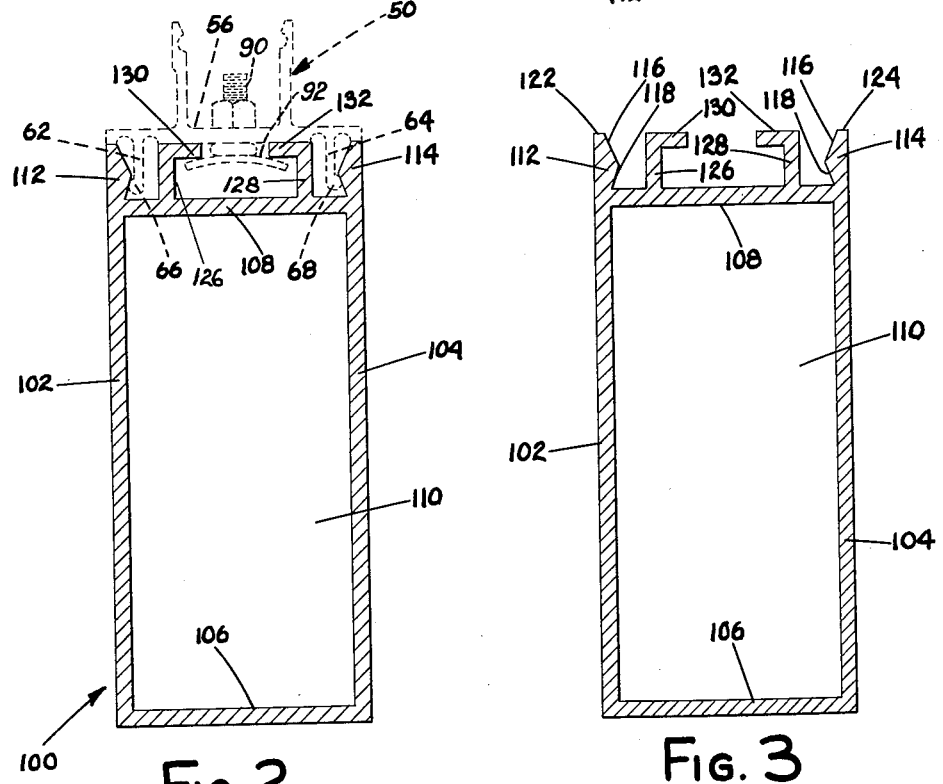
INVENTOR.
JAMES T. MILLER
BY
Price and Heneveld
ATTORNEYS United States Patent Office 3,009,548
Patented Nov. 21, 1961

3,009,548
EXTRUDED STRUCTURAL MEMBER
James T. Miller, Reed City, Mich., assignor to Miller Industries, Inc., Reed City, Mich., a corporation of Michigan
Filed July 21, 1958, Ser. No. 749,968
1 Claim. (Cl. 189—34)

This invention relates to structural members in general, and more particularly to their construction.

Structural members are known in numerous shapes, sizes, and forms as adapted to suit the requirements of a particular structure. However, there are certain structural shapes that are more commonly known than others and which have come to be known as distinct in themselves. These include the tubular form, the channel section, and the I-beam, to mention a few.

It is an object of this invention to disclose a new and different structural member having certain similarity to several other structural forms. The structural member of this invention is tubular in form and has certain similarity to the channel section form, as will be shown.

The structural member of this invention is preferably formed from lightweight metals by the extrusion process. Accordingly, it is simple to make and is light in weight. This makes it less expensive and easier to use.

The structural member of this invention is preferably made in long lengths and of a material which can be readily cut. This enables a manufacturer to run off standardized stock lengths of the structural member and permits the fabricator to cut the standard lengths to more exact size at the site of use.

The structural member of this invention includes a channel section shape which is formed to a closed tubular shape by a closing wall extending between the side wall flanges of the channel shape, near their ends, and spaced apart from the channel web. This leaves the side walls of the channel shape, or of the tubular form, deepnding on how the basic shape is described, to extend beyond the closing wall and to form spaced projections. The inwardly disposed side faces of these projections or extrusions are formed to include intersecting inwardly inclined plane surfaces. Such surfaces form a detent rib. Parts of another structural member may be brought into snap-on cooperative engagement with such ribs.

The ends of the wall projections are formed to provide abutment shoulders for engagement with the other structural member. Other abutment shoulders are formed from the closing wall. Such walls are symmetrically spaced on the closing wall and include inbent rib flanges at their terminal ends. The abutment shoulders, last mentioned, are strengthened by the inbent rib flanges and such shoulder members, in combination, from a semi-closed tubular shape on the closing wall.

One particular use for the structural member of this invention is in the framing of a curtain wall for a building. Such a use is described in my copending patent application Serial No. 710,763, filed January 23, 1958 and titled "Frame and Curtain Wall Construction."

In the drawing:

FIG. 1 shows a perspective view of a length of the extruded structural member of this invention.

FIG. 2 is an enlarged cross-sectional view of the structural member of this invention having another structural member, shown in phantom, disposed for engagement therewith.

FIG. 3 is an enlarged cross-sectional view of the structural member of this invention, by itself.

The structural member 100 is formed from a lightweight metal, such as aluminum. The structural member is preferably formed by the extrusion process.

The structural member 100 includes the channel shape mentioned which is formed by the parallel side walls 102 and 104 and the interconnecting web wall 106. The tubular form is acquired by an interconnecting wall 108 between the side walls 102 and 104, near their terminal ends, and spaced from the web wall 106. These walls, and the closed tubular space 110, extend the full length of the structural member in whatever lengths it is formed.

The terminal ends of the side walls 102 and 104, extending beyond the closing wall 108, provide rib projections 112 and 114. These ribs or side wall extensions 112 and 114 have intersecting inwardly converging plane surfaces 116 and 118 provided on their inwardly disposed side faces. The converging plane surfaces form rib detents which cooperate with parts of another structural member 50, as shown by FIG. 2. The terminal ends of the wall extensions 112 and 114 form abutment shoulders 122 and 124 which are engaged with the other structural member.

The other structural member 50 is shown in phantom to include parts 62 and 64 projecting from a wall portion 56. The projecting parts 62 and 64 include detent ends 66 and 68 which are formed for cooperation with the converging plane surfaces 116 and 118 of the structural member 100. The plane surfaces 116, nearest the terminal ends of the side wall projections 112 and 114, are first engaged by the detent ends 66 and 68. Such surfaces direct the detents 66 and 68 over the apex of the converging walls and into snap-on engagement with the plane surfaces 118.

The structural member 100 also includes ribs 126 and 128 which are formed from the closing wall 108. The ribs 126 and 128 are disposed in parallel spaced relation to the side wall extensions 112 and 114 and are symmetrically spaced apart from each other. Inbent rib flanges 130 and 132 are provided at the ends of the ribs 126 and 128. The ribs and their flanges form abutment shoulders which, like the terminal ends 122 and 124 of projections 112 and 114, are disposed for engagement with the other structural member 50. However, the rib flanges 130 and 132 are spaced slightly short of the plane of the abutment shoulders 122 and 124.

The other structural member 50 is seen to include fastener means 90. Such fastener means are for another purpose than securing the structural members 50 and 100 together. However, the head portion 92 of the fastener means is engaged under the inbent flanges 130 and 132. The fastener 90 thus serves to hold the structural members 50 and 100 engaged and the detent ends 66 and 68 of the other structural member locked to the rib detents formed by surfaces 116 and 118.

The ribs 126 and 128, with their flanges 130 and 132, form a semi-closed tubular form on the closing wall 108. This provides further structural strength for the structural member 100. It also assures protection of the side wall projections 112 and 114.

I claim:

A structural member, comprising; an elongated member of channel cross section having parallel spaced side walls and an interconnecting wall extending between said side walls behind the open face thereof, intersecting inclined plane surfaces formed on the inner side faces of said side walls near the terminal ends thereof for receiving parts of another structural member in snap-on cooperative engagement therewith, symmetrically spaced abutment shoulders formed from said interconnecting wall and extending towards the open face of said channel member and said abutment shoulders including retaining rib flanges projecting inwardly towards each other for receiving retainer means in engagement therewith.

References Cited in the file of this patent

UNITED STATES PATENTS

| | | |
|---|---|---|
| 2,015,447 | Esser | Sept. 24, 1935 |
| 2,671,539 | Kiefer | Mar. 9, 1954 |
| 2,809,726 | Farquhar et al | Oct. 15, 1957 |
| 2,885,040 | Grossman | May 5, 1959 |

FOREIGN PATENTS

| | | |
|---|---|---|
| 742,827 | Great Britain | Jan. 4, 1956 |
| 520,859 | Canada | Jan. 17, 1956 |